US011998503B1

(12) United States Patent
Bonev

(10) Patent No.: US 11,998,503 B1
(45) Date of Patent: Jun. 4, 2024

(54) SEXUAL STIMULATION DEVICES

(71) Applicant: Jordan Bonev, Haworth, NJ (US)

(72) Inventor: Jordan Bonev, Haworth, NJ (US)

( * ) Notice: Subject to any disclaimer, the term of this patent is extended or adjusted under 35 U.S.C. 154(b) by 0 days.

(21) Appl. No.: 18/518,511

(22) Filed: Nov. 23, 2023

(51) Int. Cl.
*A61H 19/00* (2006.01)
*A61H 23/02* (2006.01)

(52) U.S. Cl.
CPC ......... *A61H 19/40* (2013.01); *A61H 23/0254* (2013.01); *A61H 2201/1253* (2013.01)

(58) Field of Classification Search
CPC ........ A61H 19/00; A61H 19/30; A61H 19/50; A61H 19/40–44
See application file for complete search history.

(56) References Cited

U.S. PATENT DOCUMENTS

| | | | | |
|---|---|---|---|---|
| 4,722,327 A * | 2/1988 | Harvey | A61H 19/44 | 104/53 |
| 4,790,296 A * | 12/1988 | Segal | A61H 19/32 | 600/38 |
| 5,076,261 A * | 12/1991 | Black | A61H 19/44 | 601/93 |
| 5,851,175 A * | 12/1998 | Nickell | A61H 21/00 | 600/38 |
| 6,142,929 A * | 11/2000 | Padgett | A61H 23/0254 | 600/38 |
| 6,866,645 B2 * | 3/2005 | Lee | A61H 19/44 | 600/38 |
| 7,267,646 B2 * | 9/2007 | Tucker | A61H 19/40 | 600/38 |
| 8,186,475 B2 | 5/2012 | Sugden et al. | | |
| 8,726,812 B2 | 5/2014 | Forbes et al. | | |
| 10,518,372 B2 | 12/2019 | Bergeron et al. | | |
| 11,707,643 B2 | 7/2023 | Lagree et al. | | |
| 2010/0191048 A1 * | 7/2010 | Kulikov | A61H 19/00 | 600/38 |
| 2019/0015293 A1 * | 1/2019 | Pounders | A61H 23/0254 | |
| 2019/0343715 A1 * | 11/2019 | Kemp | A61L 31/022 | |
| 2021/0236380 A1 * | 8/2021 | Zamorano Silva | B25J 13/00 | |
| 2023/0063246 A1 * | 3/2023 | Flessas | A61H 19/32 | |

FOREIGN PATENT DOCUMENTS

CN 114305932 A * 4/2022

OTHER PUBLICATIONS

Momentum X1 Special Features - Natural 4D Movement, https://gymrail.com/4d-bike-rocker-platform-momentum-x1/ [Date accessed: Sep. 5, 2023].

* cited by examiner

*Primary Examiner* — Thaddeus B Cox
(74) *Attorney, Agent, or Firm* — Michael J. Feigin, Esq.; Feigin and Fridman LLC

(57) ABSTRACT

A sexual stimulation device comprises a housing enclosing multiple components within it to provide a covering to all the internal components of the device. A specialized hand having three degrees of freedom is projected out from the housing and enables the robotic arm to reciprocate in six linear directions which are up-down, forward-backward, left-right, and at least one degree of freedom enabling circular motion of the robotic arm. A control system installed in device allowing adjustment of speed and maintenance of one or more degrees of freedom and a wireless control interface provided in connection with control system to establish a wireless connection between a user-device and robotic arm to allow a user to operate remotely operate the robotic arm as per user's requirements.

10 Claims, 10 Drawing Sheets

SEXUAL STIMULATION DEVICES

FIELD OF THE INVENTION

The present invention relates to the field of sex robotic arms. More particularly, the present invention relates to a sexual stimulation device that has varied degrees of freedom.

BACKGROUND OF THE INVENTION

Sexual pleasure is an integral aspect of human intimacy, and the market for sexual aids and devices has seen significant evolution over the years. Conventional sex robotic arms and machines have been designed predominantly with a gender-specific focus, offering products tailored exclusively for men or women. While these devices have undoubtedly improved personal satisfaction, they often overlook the diverse and evolving needs of individuals.

An unmet need in the field of sexual aid is the lack of versatile and inclusive solutions that cater to individuals of all genders and sexual preferences. Furthermore, a prevalent issue with current sex robotic arms/machines is the limited degree of freedom they offer in terms of motion. The majority of these machines are restricted to a single degree of freedom (DOF), limiting the range and variety of experiences they can provide.

In addition to the limitations of DOF, the control mechanisms of these machines are often rudimentary, allowing users to manipulate the speed for only one DOF. This one-dimensional control is limiting, as it fails to capture the full spectrum of sensations that can be desired.

Additionally, the issue of penetration depth control has largely been overlooked by current machines available in the market. The ability to customize penetration depth is a key component of sexual satisfaction and personal preference, and the absence of this feature in existing devices has left users wanting.

Furthermore, the control methods employed by conventional sex machines are tethered and restrictive. Wired controllers limit user mobility and can disrupt the flow of intimate moments.

Finally, sound reactivity, an aspect of sexual pleasure that can significantly enhance the experience, is entirely unexplored in the realm of sexual machines. The absence of this feature in existing products overlooks the potential for more immersive and responsive encounters.

Thus, there exists a long-standing necessity to meet the above-highlighted unaddressed needs within the field of sexual aids and devices and develop a sex robotic arm/machine designed to be inclusive of all genders and sexual preferences. Such a device should offer an increased range of motion with multiple degrees of freedom, grant enhanced control over speed, enable customization of penetration depth, and empower users to fully explore their desires. Furthermore, there is a need to offer a user-friendly controller for more intuitive control, along with features that enhance sexual pleasure, providing a more immersive experience.

SUMMARY OF THE INVENTION

An object object of the present invention is to overcome the above-stated problems identified in the prior art.

An object of the present invention is to develop a sex robotic arm that provides multiple degrees of freedom of motion and also provides a unique means for attaching the required attachments of a user's choice.

Another object of the present invention is to develop a sex robotic arm that is not gender specific and can be used by any user as per requirement.

Another object of the present invention is to develop a sex robotic arm that provides a provision to the user to remotely alter the degree of freedom during utilization and allows the user to alter various parameters of erotic arousal.

Yet another object of the present invention is to develop a sex robotic arm that is compact and portable in structural design.

The present invention relates to a sex robotic arm that is not gender specific and can be used by any user of any gender as per requirement. The present invention also provides a means to remotely alter the motion of the sex robotic arm. In addition, the device provides a compact and portable structural design.

According to an embodiment of the present invention, a sexual stimulation device comprises a housing defining a structure of the device and enclosing multiple components of the device within it to provide a cover to all the internal components of the device. A robotic hand is projected out from the housing having three degrees of freedom which enables the robotic arm to reciprocate in standard six linear directions which are up-down, forward-backward, left-right, and at least one degree of freedom enabling circular movements of the robotic arm. A control system configured within the device that allows for adjustment of speed and maintenance of one or more degrees of freedom and a wireless control interface configured in connection with the control system to establish a wireless connection between a wireless user-device and the robotic arm for a user to operate the robotic arm as per the user's requirements.

In another embodiment of the present invention, an audio-receptive control unit is provided, which includes an autonomous mode triggered by an audio signal input where at least one specific frequency in the audio signal input corresponds to a particular movement of the robotic arm In another embodiment of the present invention, the control system is configured to adjust the speed of two degrees of freedom along with maintaining the two degrees of freedom at fixed speeds.

In another embodiment of the present invention, the control system comprises a penetration control mechanism for enabling precise control of penetration depth within a range of 1 to 7 inches in multiple discrete steps.

In another embodiment of the present invention, the reciprocating motion of the robotic arm is facilitated by multiple linear rails organized into two groups, each group comprising two linear rails, such that one end of the top rail attached to a gantry mounted on the bottom rail and the other end attached to the robotic arm hand.

In another embodiment of the present invention plurality of flexible couplings connected to the two linear rods attached to the top rails for enabling yaw movements by utilizing their flexibility to create left and right motions.

In another embodiment of the present invention, the reciprocating movements of the robotic arm in a linear direction are controlled by the two linear rails holding the main gantry and supported by four sliders to ensure stability.

In another embodiment of the present invention, the device further includes an attachment of one end of a center axis to a hand crank and the other end to a motor for enabling circular movements of the robotic arm with the off-centre point of the hand crank to define a radius of the circular motion of the arm.

In another embodiment of the present invention, the hand crank is designed with two flanges attached to each other with offset centers, visually resembling a cone on high-speed rotations.

In another embodiment of the present invention, the device features the capability to maintain attached objects in an upright position during rotational movements of the robotic arm in a circular direction, such that the objects are securely attached and remain upright without the need for additional mechanical support.

In another embodiment of the present invention, a reciprocal linear actuator with real-time stroke length control is installed in the device to allow continuous adjustment of the stroke length for linear movement during operation without interrupting the action.

In another embodiment of the present invention, the yaw movement is achieved by alternating two linear actuators, with one actuator fully stopped while the other pushes or pulls, thus creating the yaw movements combined with reciprocating movements.

In another embodiment of the present invention, a specialized hand is configured with the robotic arm to accommodate one or more unisex robotic arms.

In another embodiment of the present invention, a firmware system employing seven ESP32 micro-controllers, in which one acts as a master controller, four controls the stepper motors, one for sound-reactive control, and one for LEDs to ensure precise and synchronized operation of the robotic arm.

In another embodiment of the present invention, an open-source library to intercept Bluetooth communication between the game controller and the microcontroller to allow the robot to be controlled in a manner different from traditional computer numerical control (CNC) methods.

In another embodiment of the present invention, the interface is adapted for wireless connection with a game controller to allow a remote operation of the robotic arm.

In another embodiment of the present invention, a specialized ESP32 micro-controller board is designed for Fast Fourier Transformation (FFT) spectrum analysis, enabling real-time analysis of audio input and responsive robotic arm movements based on sound frequencies In another embodiment of the present invention, the game controller features two display screens, the first screen displays a representation of the connected game controller when in manual control mode, and the second screen displays motor speed in RPM and forward/backward distance in inches when in autonomous mode.

DETAIL DESCRIPTION OF THE INVENTION

The present invention relates to a sexual stimulation device that provides different modes of usage to a user and provides a provision to remotely operate the device for adjusting the motions of the device.

Figure 1:
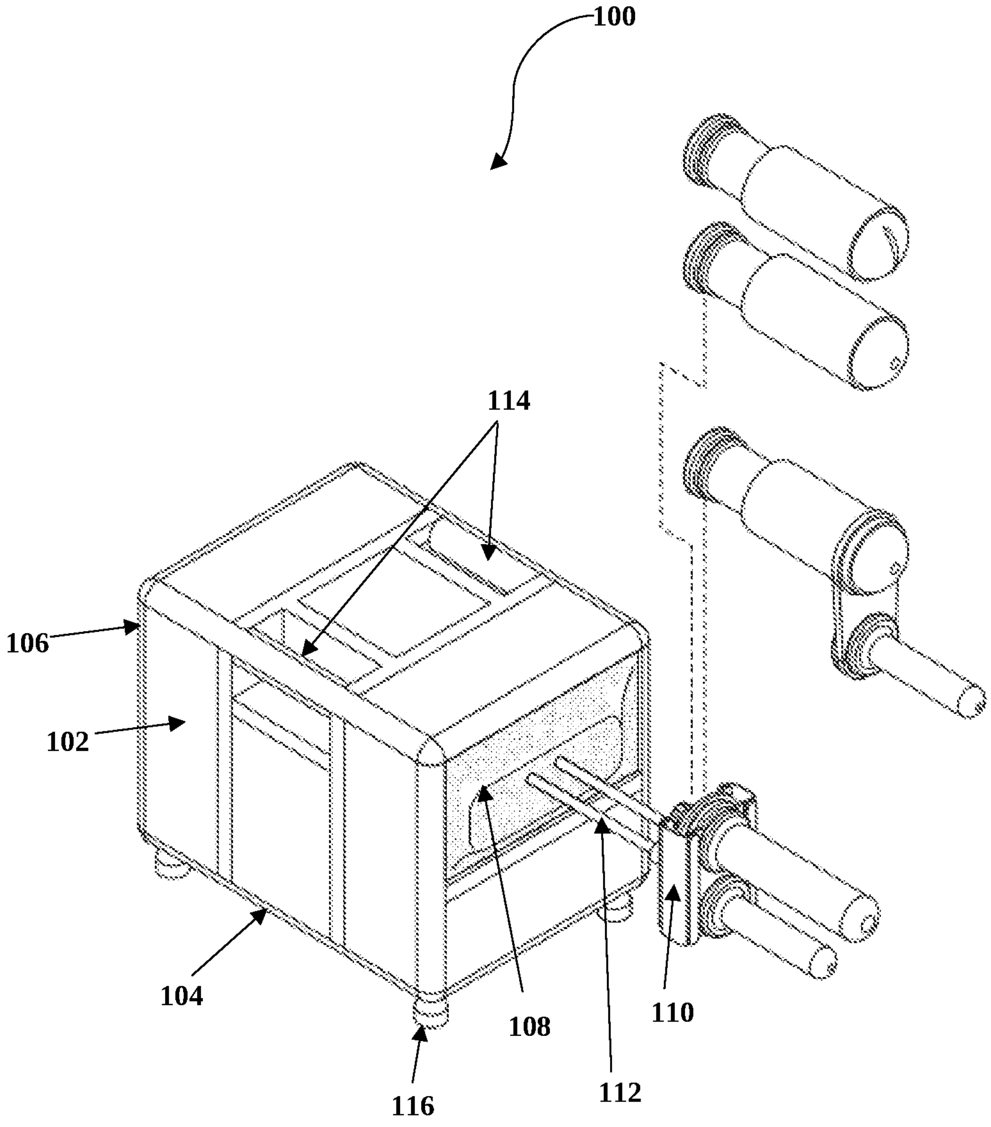
FIG. 1 is a perspective view of a sexual stimulation device.

FIG. 1 illustrates a perspective view of a sexual stimulation device 100 that comprises a housing 102 defining a structure of the device. The housing 102 includes a base 104 and a back panel 106 to support a transmission assembly and at least one driving means that provide for the various DOF for one or more attachments protruding out of the housing 102. A cover may be placed on top of the base with support from the back panel 106 to cover the machinery inside the housing, as will be appreciated by a person skilled in the art. The cover may be adapted to lock over the base 104 as well. In an embodiment, the housing 102 includes a pair of handles 114 for providing portability to the device 100.

In an embodiment, an opening 108 is provided on a front wall, opposite the back panel 106, of the housing 102. The opening 108 allows a specialized hand 110 to extend out of the housing 102 for allowing an attachment of various types of unisex robotic arms thereto. The hand 110 is attached to a robotic arm 112 which is in turn coupled to the drive means via the transmission assembly. Multiple bottom supports 116 are attached underneath each corner of frame 104 to provide balance and stability to the whole device over a ground surface. The bottom supports 116 are made up of materials selected from, but not limited to, vulcanized rubber blocks, synthetic rubber blocks, and the like, which absorb vibrations and fluctuations produced by the device 100 during operation.

Figure 2:
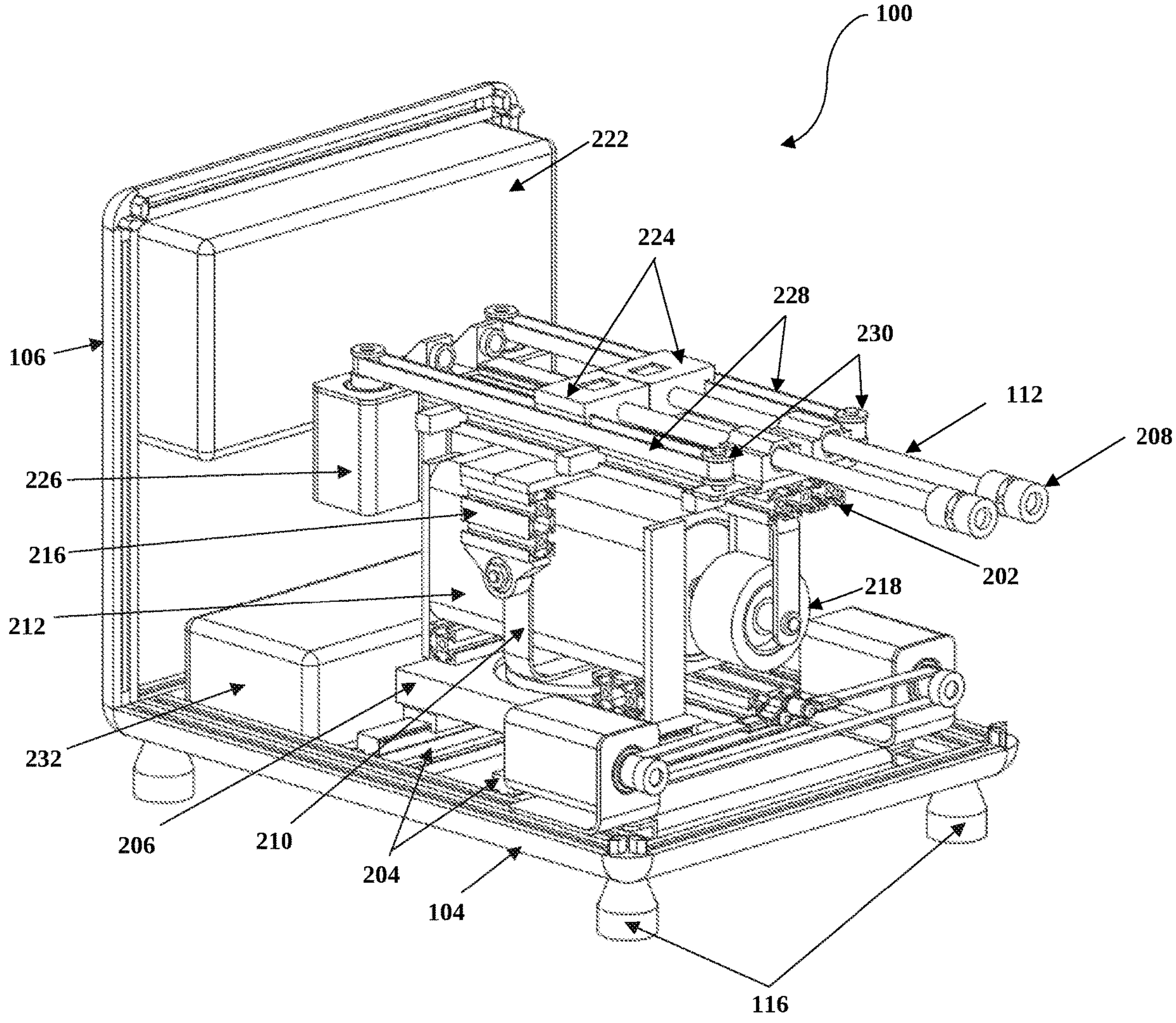
FIG. 2 is a perspective view of the sexual stimulation device showing the internal components of the device.

FIG. 2 is a perspective view of the sex stimulation device 100 with the transmission assembly illustrated in detail. The robotic arm 112 is provided with three degrees of freedom which allows the robotic arm 112 to reciprocate in standard six-linear directions, i.e., up-down, forward-backward, and left-right, along with at least one degree of freedom enabling circular movements via the transmission assembly.

The reciprocation motion of the robotic arm 112 is facilitated by multiple linear rails organized into two groups, namely upper linear rails 202 and lower linear rails 204. Each group of rails 202 and 204 comprises two linear rails positioned parallel to each other. The upper linear rails 202 are in connection with the robotic arm 112 via a slidable-block 224 mounted over each rail of upper linear rails 202. The slidable-block 224 is a type of cuboidal box-shaped entity, mounted over upper linear rails 202 from one face and connected with the robotic arm 112 from the adjacent face in order to provide horizontal reciprocation to the hand 110 via robotic arm 112.

The upper linear rails 202 are also configured in a connection with the lower linear rails 204 via a gantry mounted on the lower rails 204. The upper linear rails 202 are arranged in such a manner that one end of the upper linear rails 202 is attached to the gantry, and the other end of the upper linear rails 202 is attached to the specialized hand 110 via the robotic arm 112. Further, at the other end of the robotic arm 112 a pair of flexible couplings 208 is attached, allowing a means for attaching the hand 110 to the robotic arm 112. The robotic arm 112 along with the hand 110 is coupled with the upper linear rails 202 to enable yaw movements by utilizing the flexibility of the flexible couplings 208 to provide left and right directional motions to the specialized hand 110.

As illustrated in FIG. 2, the gantry as disclosed above comprises a base plate 206 having a cuboidal-shaped orientation, positioned over the lower linear rails 204 for providing a base-structure of the gantry. The base plate 206 is supported over the lower linear rails 204 by means of a plurality of sliders, moving the base plate 206 over the lower linear rails 204. The sliders provided with the base plate 206 are four in number and provide a sideways linear directional motion to the gantry, which in turn provides a final sideways motion to the hand 110 along with the robotic arm 112.

On the base plate 206, a U-shaped bracket 210 is pivoted from the center of the bracket 210 to provide a means for attaching/placing a motor 212 over a pair of supporting bars 214 placed over the base plate 206 within the U-shaped bracket 210. The motor 212, adapted to be placed within bracket 210, is fixed over the bars 214 by an inverted U-shaped clamp 216 configured with bracket 210. The inverted U-shaped clamp 216 is pivoted from the legs of the U-shaped bracket 210 in such a manner that the clamp 216 provides a vertical reciprocating motion to robotic arm 112 when tilted together along with the actuation of a hand crank 218 coupled with the motor 212, placed over the base plate 206 via the supporting bars 214.

In the pursuit of a orientation-preserving device, a three linkage, motorized device results in a 2D planar, circular motion of an attached object where the vertical and horizontal orientation of the aforementioned object is fixed in space. The object will be referenced to as the "target" for this description. The primary components of the system are: a base, motor, a bearing with axial motion off-set from the motor, a 90 degree metal linkage that the target attaches to, a planar linkage attached to a yoke, and a lower linkage attached to a bearing fixed to the base. Pertinent hardware are found in FIGS. 1 to 5. The result is a two degree of freedom (DOF) system.

The proposed device may be fixed to any flat surface. The electronically controlled motor connects to a self-aligning bearing center of which the distance between defines the circular movement diameter. The motor will bear much of the supporting forces of the device, so it is attached rigidly to the base by appropriate hardware and supports. With the motor, motion begins as a degree of freedom system with rotation along one axis. Attached to the motor is a self-aligning bearing which rotates off-axis from the motor, resulting in a 3 degrees of freedom with rotation along one axis and XY motion in a plane.

The linkages attached to the self-aligning bearing remove the rotational degree of freedom. From the end of the self-aligning bearing, a 90-degree linkage is attached with the shorter end attached to the bearing and the longer end aligned above the assembly along the length of the base. The "target" is then attached to the short end or bottom end of the longer end. It is this plane that maintains two degrees os freedom (DOF) with fixed orientation. The longer end of the 90-degree linkage is attached to two pin-supports on the second linkage system attached to bearing yokes. This linkage assembly removes the unwanted rotational DOF but also the x-axis DOF, so the entire linkage is attached to the final linkage system which is attached to the rotational bearing secured to this base. This re-introduces the x-axis DOF, resulting in an xy-DOF system in the plane of the output axis of the self-aligning bearing with no rotational movement of the "target".

The hand crank 218 coupled with the motor 212 is an arrangement of two flanges 220 like entities. Both flanges 220 are attached to each other with offset centers or eccentric centers, which visually resemble a cone-shaped entity rotating on high-speed rotations (defined as "at least 60 revolutions per minute"). The flange arrangement 220 of the hand crank 218 provides an attachment of one end of a center axis of the hand crank 218 with upper linear rails 202. While the other end of the hand crank 218 is connected to motor 212 to enable circular movement of the robotic arm 112 due to the off-centre point of the flanges in the flange arrangement 220 of the hand crank 218.

This motion of the hand crank 218 defines the radius of the circular motion provided to hand 110 via the robotic arm 112. The hand crank 218 is further integrated/encompasses the capability of maintaining attached objects, which includes different types of sex robotic arms, in an upright position during movements of the hand 110 via the robotic arm 112 in a circular direction. This capability of securely maintaining the posture of the attached objects does not require the need of any additional mechanical support.

A control system 222 is installed in the device for controlling all the functioning of the device, allowing speed adjustment, and maintenance of one or more degrees of freedom of the hand 110. Also, the control system 222 is configured to adjust the two degrees of freedom at varying speeds as well as to maintain two degrees of freedom at fixed speeds. The control system 222 disclosed here is integrated with a firmware system, employing seven ESP32 microcontrollers. The microcontroller is configured by the firmware in a manner that one of the microcontroller acts as a master controller, four of them controls stepper motors, one for sound-reactive control, and one for LEDs, ensuring precise and synchronized operation of the robotic arm 112.

Further, in the control system 222 a penetration control mechanism is installed, which helps in enabling the precise control of penetration depth. The penetration control mechanism includes a set of upper stepper motors 226 connected with a conveyor belt 228. The conveyor belt 228 is configured within the penetration control mechanism in a loop form, such that each conveyor belt 228 is fixed at one end via rotatable pulley 230. While the other end of the conveyor belt 224 is connected with the motor 226 by passing through a slot of the slidable-block 224 for providing reciprocation to the hand 110 during the combined actuation of upper stepper motors 226 and upper linear rails 202, thereby enabling precise control of penetration depth within a range of (1 to 7 inches) in multiple discrete steps.

Furthermore, the control system 222 is installed with a wireless control interface which establishes a wireless connection between the control system 222 and a wireless user device. The wireless control interface disclosed here, is a type of communication module selected from, but not limited to, Wi-Fi (wireless fidelity) module, Bluetooth, and alike, for establishing a wireless connection between the control system 222 and the wireless-user device. The established wireless connection, allows the user to remotely operate the device by providing inputs via the wireless user-device, in order to operate the hand 110 via the robotic arm 112 in various degrees of freedom to achieve different motions of the hand 110.

The wireless-user device disclosed here is a type of remote control that can be selected from a group including, but not limited to a smartphone installed with a user interface, a game controller, a game console module, and the like. In an embodiment, the wireless user device is a type of game controller that is connected wirelessly to the control system 222 via the wireless user interface. In another embodiment, the wireless user device can be a virtual reality headset to provide various realistic visuals to the user, thereby providing a realistic experience to the user while utilizing the device.

Moreover, the device is installed with two display screens which are utilized for operating, and controlling functioning, along with the selection of mode of usage of the device. The mode of usage of the device includes a manual control mode and an autonomous mode. The display screens disclosed above is a type of interactive LED (light emitting diode) screens or LCD (liquid crystal display) screens. Among both the screens, one of the screens illustrates a representation of the connected game controller, when the mode of the device corresponds to manual control mode While the other/second screen displays the speed of motor 212 in RPM (revolution per minute) along with the distance of forward/backward stroke of the hand 110, due to actuation of upper stepper motors 226, in inches when the mode of usage corresponds to autonomous mode.

Lastly, the device is installed with an audio-receptive control unit 232 which is associated in a connection with the control system 222. The audio-receptive control unit 232 comprises an audio receiver that gets triggered upon selection of autonomous mode via the second screen, for receiving an audio signal input through an open source library of various audio files. Upon receiving the audio signal inputs, the control system 222 further generates a command to activate a specialized ESP32 micro-controller integrated into the audio-receptive unit 232 to fetch the received input for Fast Fourier Transformation (FFT) spectrum analysis of the received audio signal input.

The specialized microcontroller is an ESP32 microcontroller board, which upon fetching the audio signals, enables real-time analysis of audio input for processing the audio frequencies and transmits the processed inputs to control system 222. The control system 222 on receiving the processed data from the specialized microcontroller further actuates and controls the robotic arm 112 movements corresponding to the processed audio frequencies. The actuation of the robotic arm 112 provides multiple degrees of motion to the hand 110, such that at least one specific frequency of the audio signal input corresponds to a particular robotic arm 112 movements.

Hereinafter, all the motions according to the degrees of freedom, of the device are illustrated in the remaining figure from 3A to 7B.

Figure 3A:
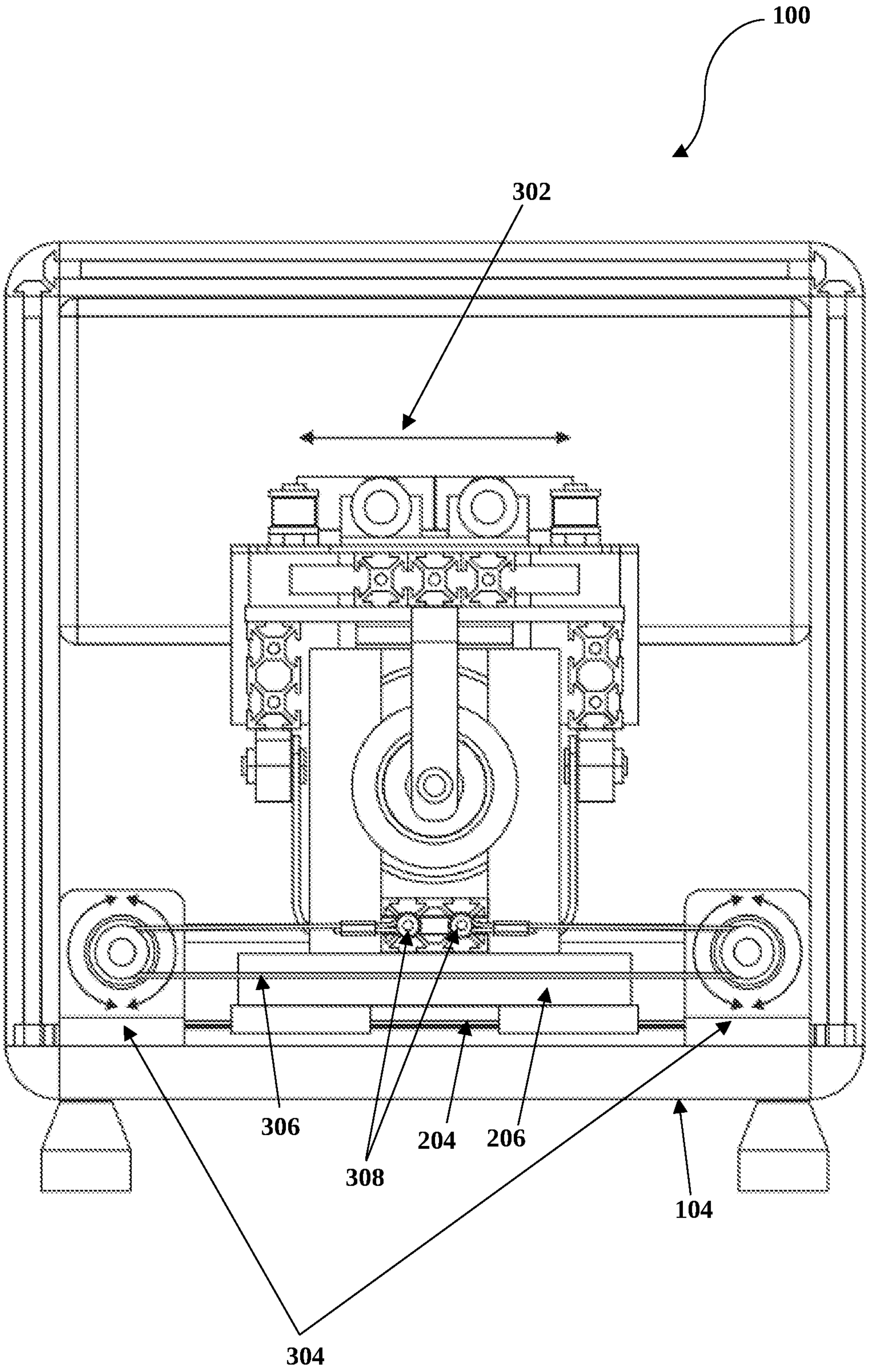
FIG. 3A is a front view of the sexual stimulation device illustrating sideways linear motion.
Figure 3B:
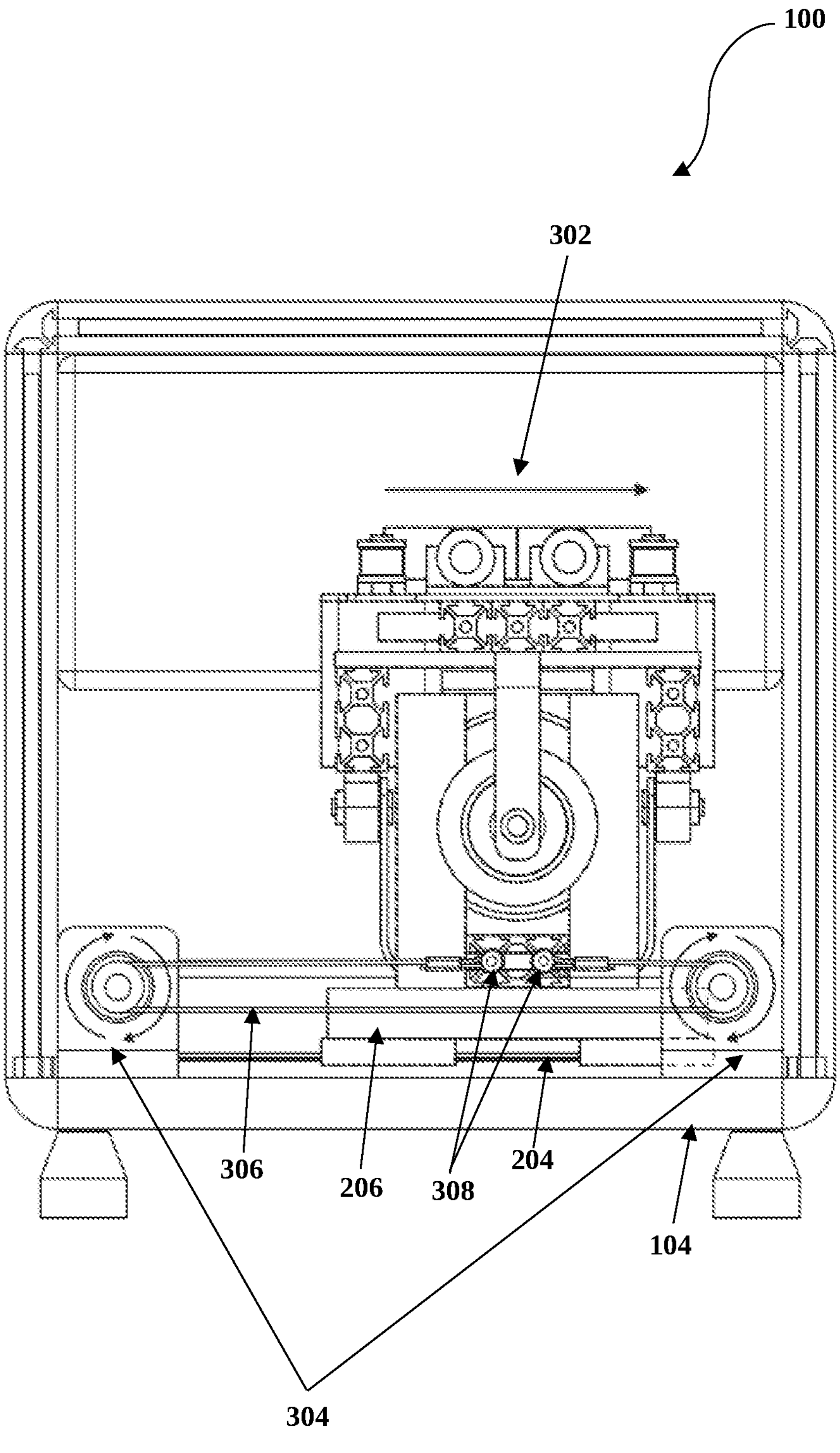
FIG. 3B is a front view of the sexual stimulation device illustrating sideways linear motion in operation.

Referring to FIG. 3A-3B, a front view of the sexual stimulation device illustrates the direction of sideways linear motion 302 in operation. FIG. 3A illustrates a set of lower stepper motors 304 are installed on the base frame 104 and are configured with a belt drive 306. The belt drive 306 is arranged in a loop in such a way that the free ends of the loop of the belt drive 306 are fastened with the base plate 206 by means of suitable fasteners 308 which include, but not limited to, nut and bolts, screws and the like.

When any of the modes, manual mode or autonomous modes, is selected for operation, then the control system 222 activates the lower stepper motors 304 to actuate alternatively in the opposite direction. This opposing and alternative rotation of the lower stepper motors 304 then pulls and releases the belt drive 306, which in turn pulls the base plate 206 to slide over lower linear rails 204, as illustrated in FIG. 3B, resulting in the left and right motion of the gantry which includes the assembly of base plate 206, U-shaped bracket 210, inverted U-shaped clamp 216, upper linear rails 202 and robotic arm 112, thereby providing a final sideways motion to the hand 110.

Figure 4A:
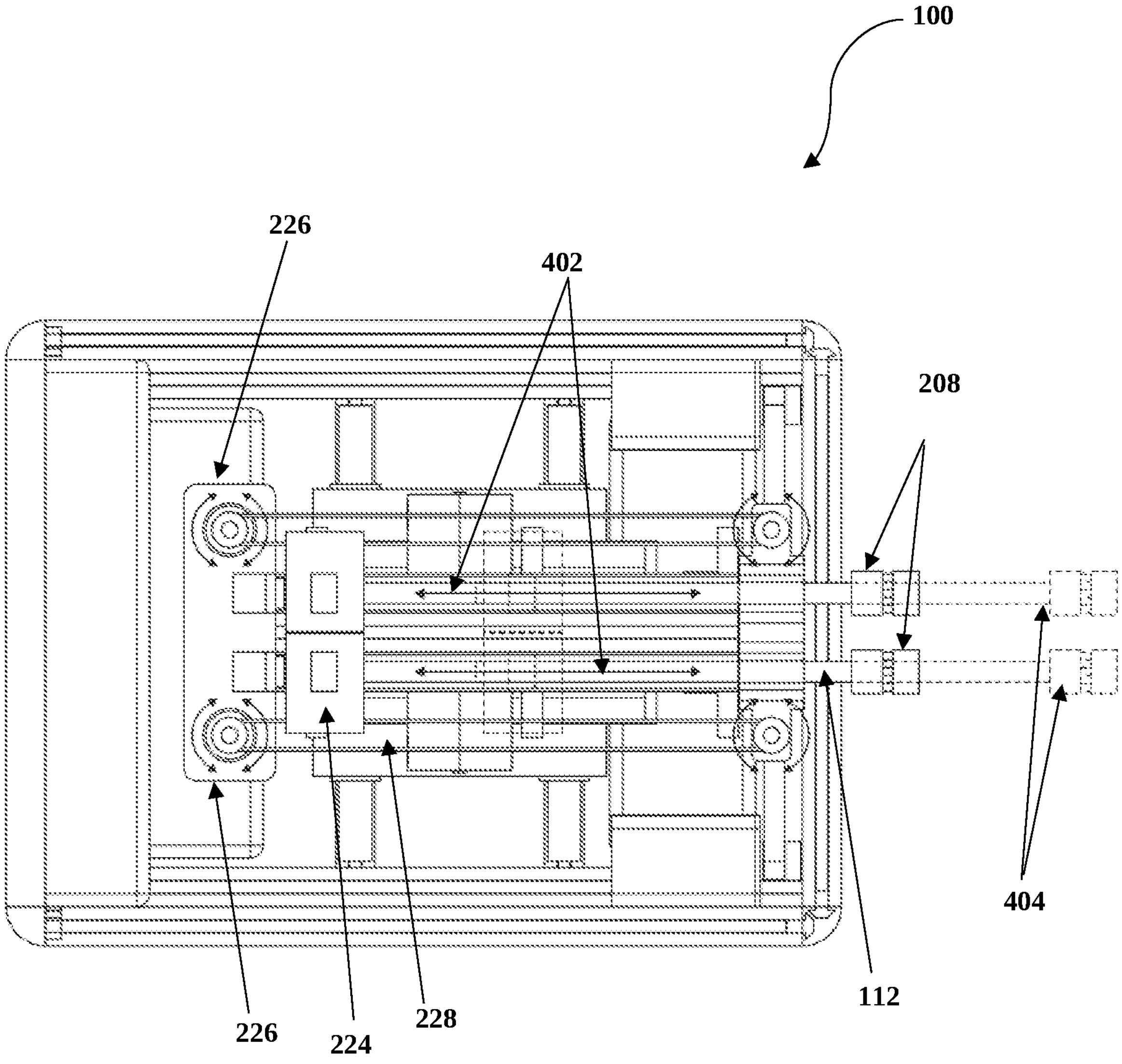
FIG. 4A is a top view of the sexual stimulation device illustrating forward and backward linear motion in operation.

FIG. 4A illustrates a top view of the sexual stimulation device 100 that shows the direction of forward and backward linear reciprocation motion 402 in operation. When any of the modes, manual mode or autonomous modes, is selected for operation, the control system 222 activates the set of upper stepper motors 226 to actuate simultaneously in the same direction to pull and release the conveyor belt 228 of both the upper linear rails 202 simultaneously. This simultaneous pulling and releasing of the conveyor belt 228 results in the sliding of slidable-block 224 over the upper linear rails 202. This sliding motion of the slidable-block 224 pushes and pulls the hand 110 along with the robotic arm 112, thereby providing forward and backward or linear reciprocation motion 402 to the hand 110 as indicated by 402 in FIG. 4A. The dotted lines 404 developing the imaginary illustration of the couplings 208 showing the length of stroke during forward and backward motion of their hand 110.

Figure 4B:
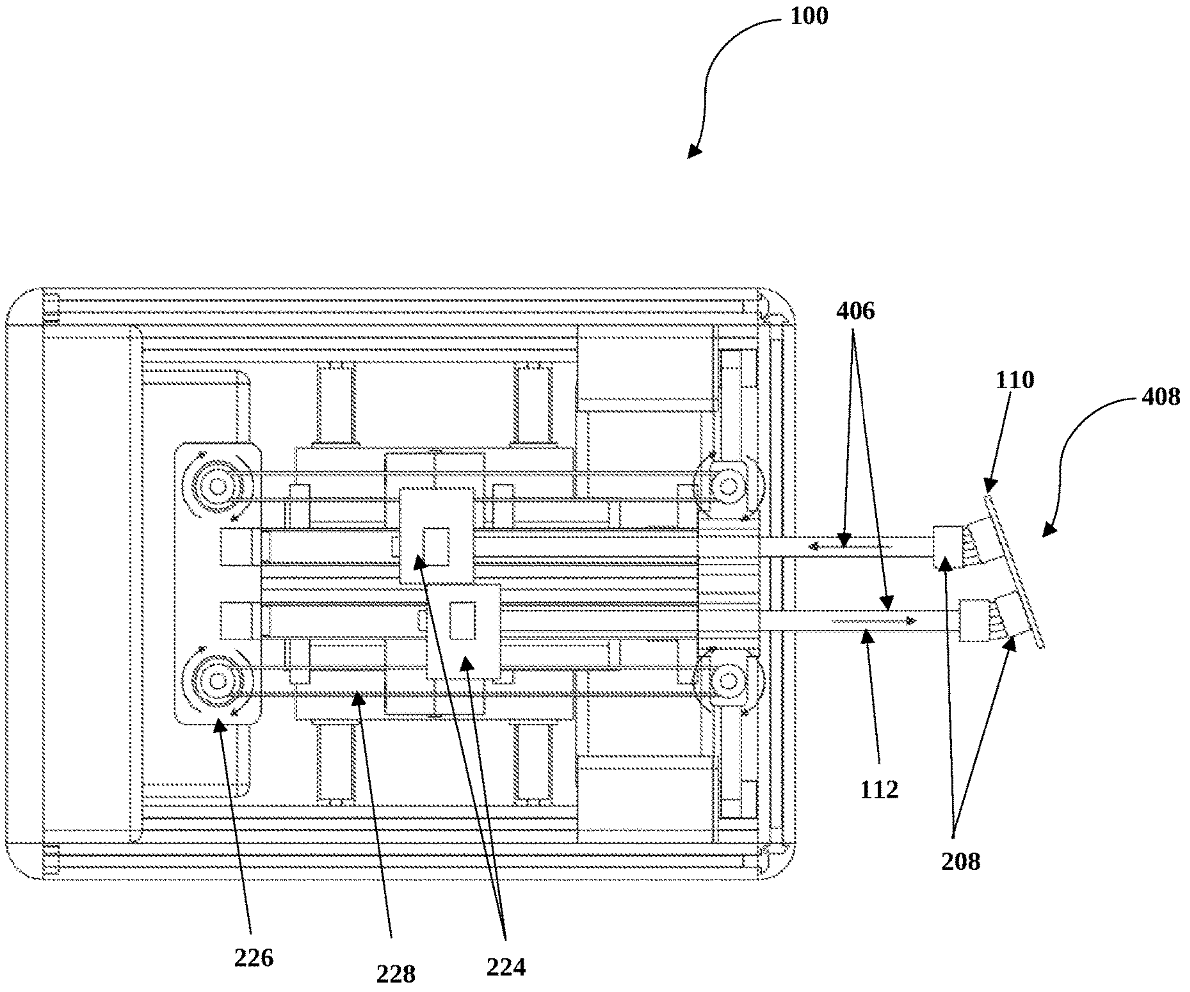
FIG. 4B is a top view of the sexual stimulation device illustrating yaw motion in operation.

FIG. 4B illustrates a top view of the sexual stimulation device 100 that shows the yaw motion 408 of the hand 110 in operation. When any of the mode either manual mode or autonomous modes is selected for operation, the control system 222 generates a relative command to alternatively actuate the upper stepper motors 226 in opposite direction. Such that one of the upper stepper motor 226 is fully stopped while the other pushes or pulls the conveyer belt 228. Due to such actuation of the upper stepper motors 226, each of the slidable-block 224 starts sliding over the upper linear rails 202 for alternate pulling and releasing the conveyor belt 228. This alternate pulling and releasing of the conveyor belt 228 results in sliding of slidable-block 224 periodically over the upper linear rails 202, thereby providing yaw motion 408 combined with alternative reciprocating motion 406 to the hand 110 along with robotic arm 112 as indicated by numeral 406 in the FIG. 4B.

Figure 5:
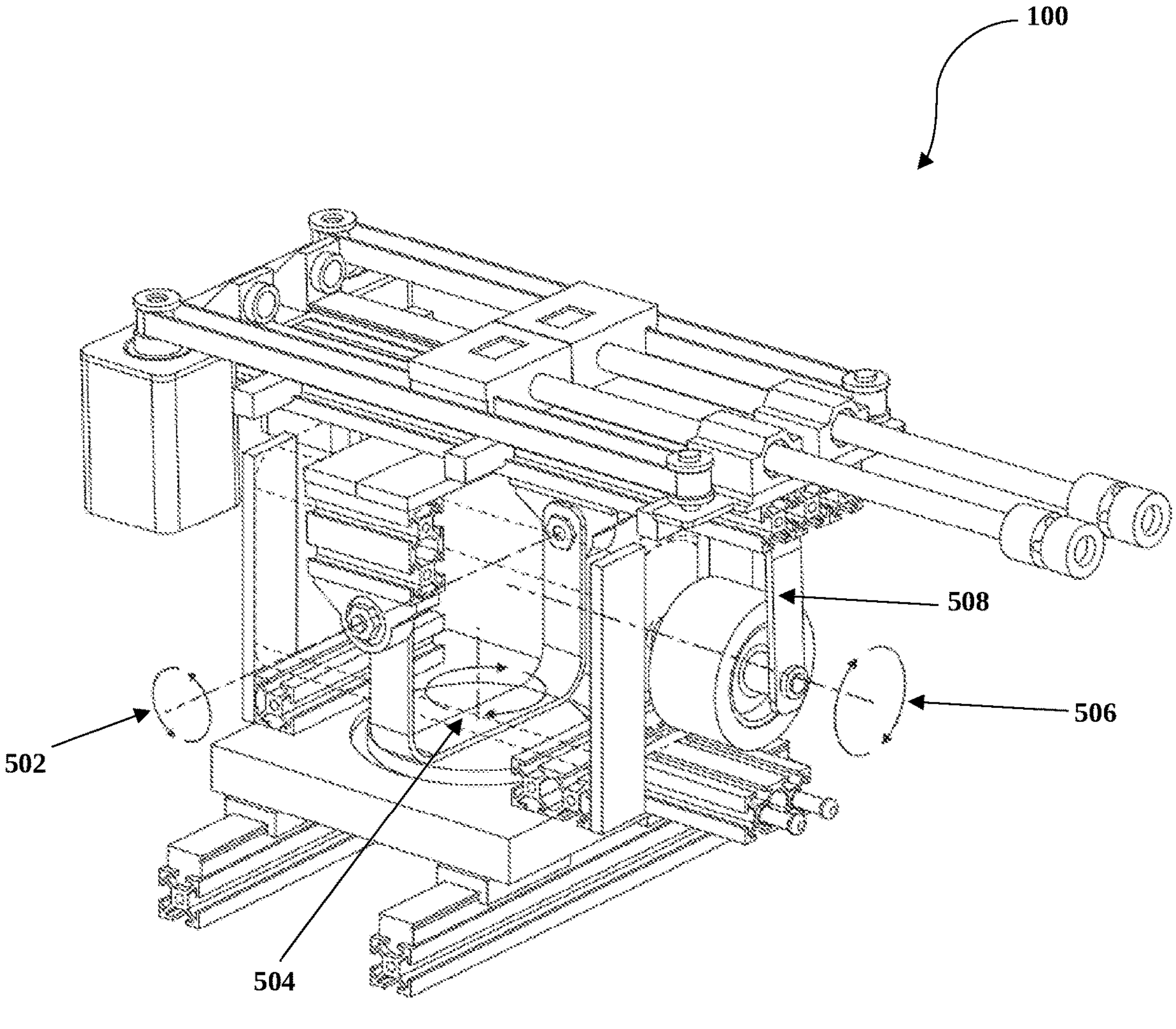
FIG. 5 is a perspective view of the sexual stimulation device illustrating the circular motions of the device in operation.

FIG. 5 is a perspective view of the sexual stimulation device 100 that illustrates a circular motion of the device 100 in operation. Upon actuation of the device 100, in any of the operational modes, either manual mode or autonomous mode, the control system 222 in combination activates the set of upper stepper motors 226, the lower stepper motors 304, and the motor 212 placed on the supporting bars 214 within the U-shaped bracket 210. All the motors 226, 204, and 212, upon activation, start actuating the relevant or corresponding connection of conveyor belts 228, belt drive 306, and hand crank 218 respectively (as discussed in FIGS. 2 and 3).

This combined motion of motors along with corresponding connections results in rotation of U-shaped bracket 210, inverted U-shaped clamp 216, and hand crank 218 as indicated by 504, 502, and 506 respectively, which in turn provides a rotational degree of freedom to the hand 110 via the robotic arm 112. The 502 provides the motion to the clamp 216 along its axis to provide up and down motion to the hand 110. Here, reference 504 illustrates the rotation of U-shaped bracket 210 to provide left and right tilting motion to hand 110 and lastly 506 shows the rotational direction of hand crank 218 connected with upper linear rails 202 via an arm 508. These all motions 504, 502, and 506 of the device provide a combined rotational movement to the hand 110 as a resultant motion.

Figure 6A:
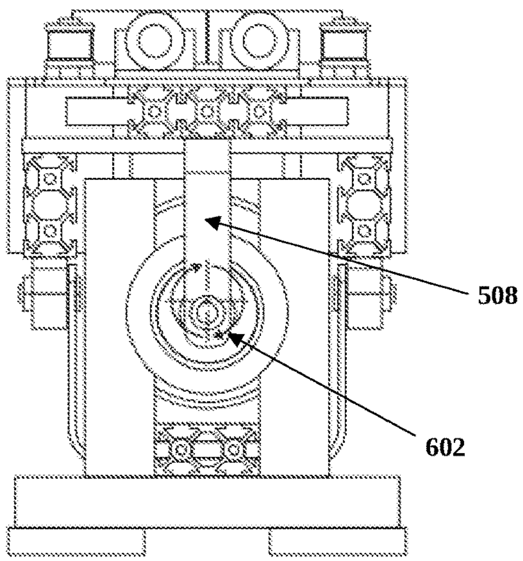
FIG. 6A is a front view of the sexual stimulation device illustrating rotational motion during actuation.
Figure 6B:
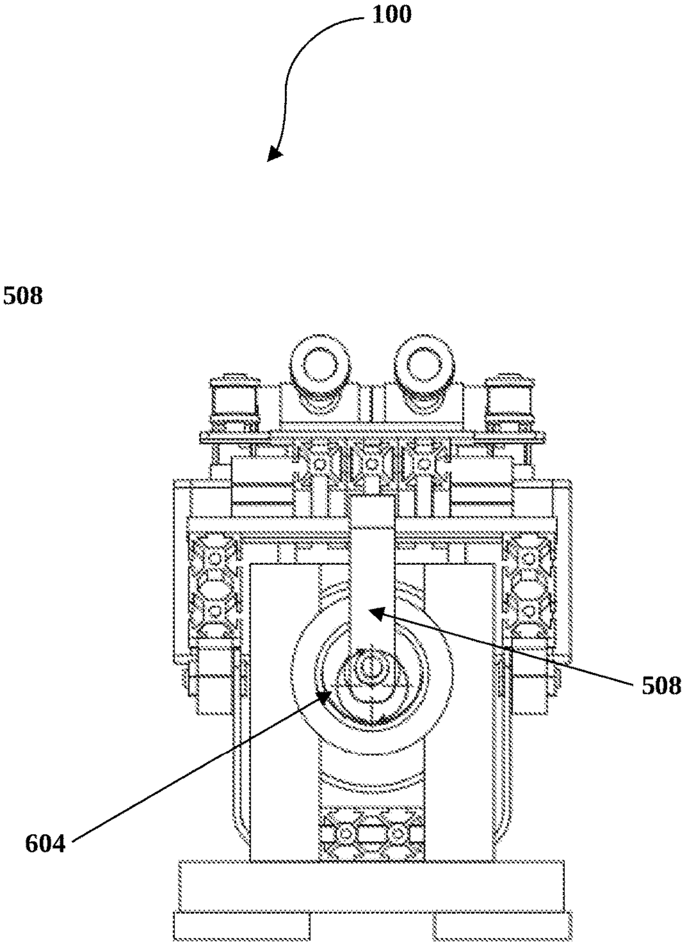
FIG. 6B is a second front view of the sexual stimulation device illustrating rotational motion during actuation.
Figure 6C:
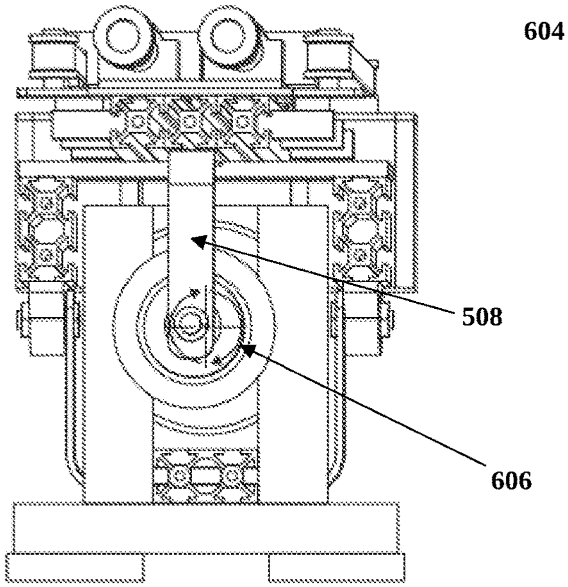
FIG. 6C is a third front view of the sexual stimulation device illustrating rotational motion during actuation.

Referring to FIG. 6A-6C, a front view of the sexual stimulation device illustrates the eccentric motion of the hand crank 218 providing a resultant rotational motion of the hand 110. FIG. 6A, 602 shows the lower position of the hand crank 218 in a stationary state. In FIG. 6B, illustrates a slight rotation of the hand crank 218 resulting lifting of the robotic arm 112 to a certain height. Similarly, in FIG. 6C, the 606 shows competition of one rotation of the hand crank 218, which provides further rotation to the robotic arm 112 to move in a circular direction. This repeated motion of hand crank 218, (indicated by 602, 604, 606) results in a continuous circular motion of the robotic arm 112, which finally provides a rotational resultant motion to the hand 110

Figure 7A:
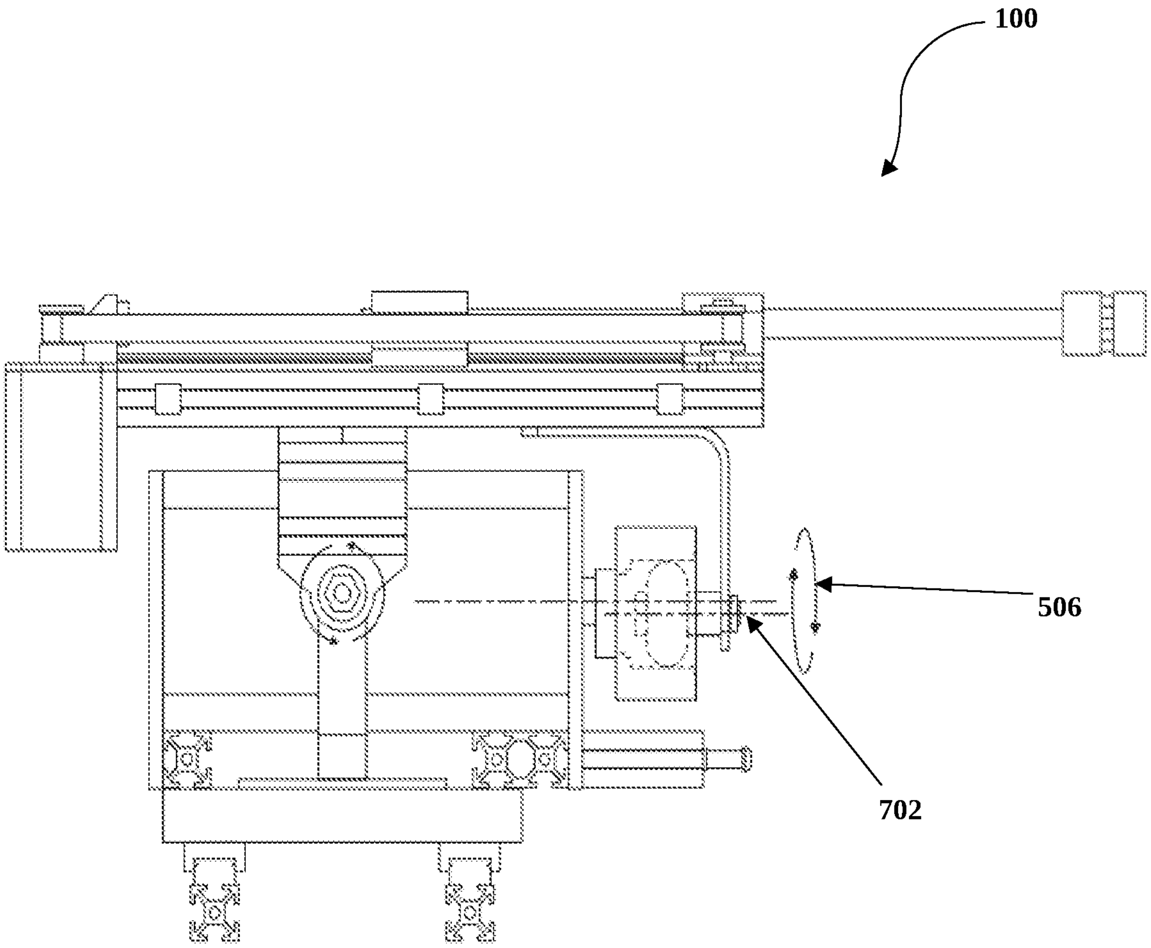
FIG. 7A is a side view of the sexual stimulation device illustrating reciprocation of motion in operation.
Figure 7B:
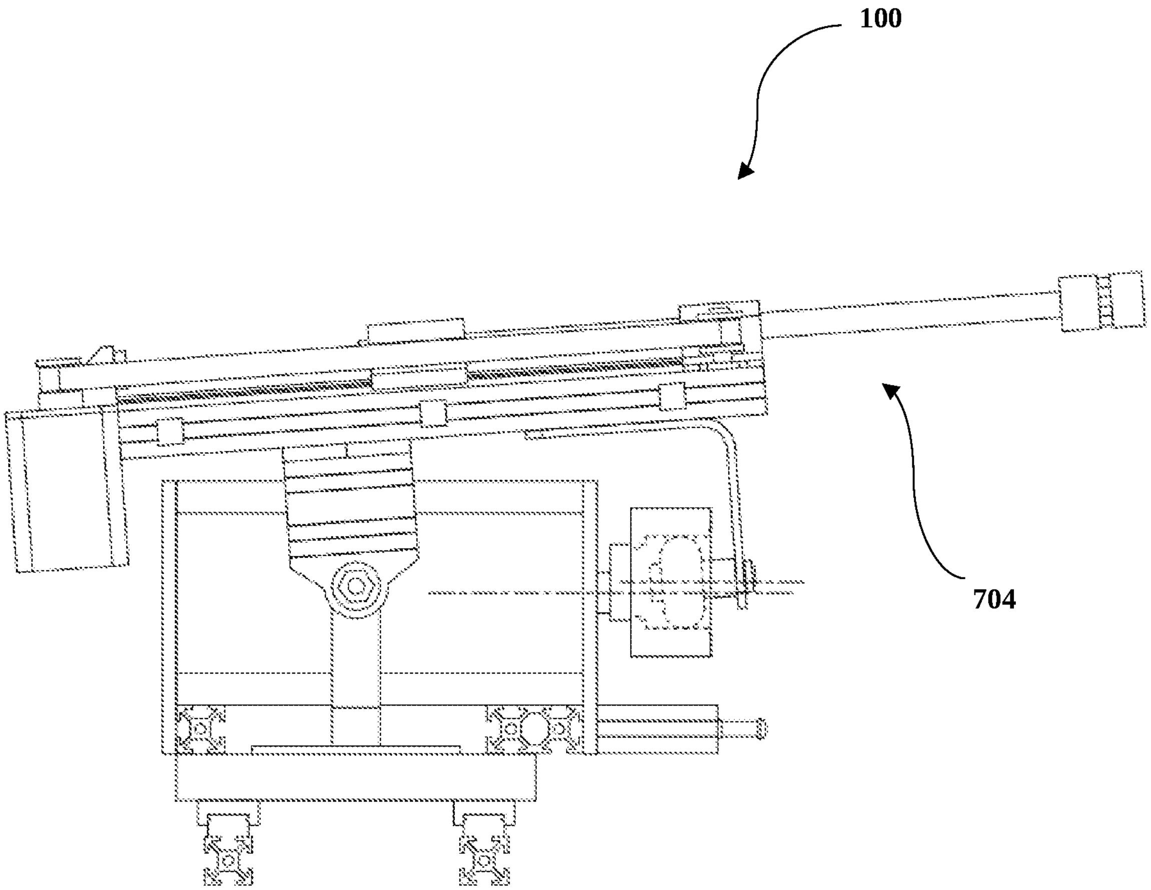
FIG. 7B is a second side view of the sexual stimulation device illustrating reciprocation of motion in operation.

FIG. 7A-7B is a side view of the sexual stimulation device illustrating reciprocation of motion in operation. In FIGS. 7A and 7B, 702 illustrate the eccentric axis of both the flanges of the flange arrangement 220. On actuation of the device, the motor 212 starts rotating the hand crank 218. Due to the rotation of the hand crank 218, the flanges arranged within the flange arrangement 220 of the hand crank 218 start rotating. As the flanges are arranged eccentrically, due to eccentric rotation of the flanges 220, the arm 508 connecting the hand crank 218 with upper linear rail 202 lifts the robotic arm 112 along with hand 110 and rotates the arm corresponding to the motion of rotation 506 of the hand crank 218. This continuous rotation 506 of hand crank 218 provides circular motion and reciprocation motion 708 to the robotic arm 112, in order to provide a combined resultant motion to the hand 110.

All of the above-discussed motions of operation of the sexual stimulation device 100 can be controlled manually by the user via the game controller in manual mode. As well as, such motions can also be controlled automatically on the basis of frequencies of audio signal inputs, received via the audio receptive unit/control unit 232, if in case the autonomous mode of operation of the sexual stimulation device 100 is triggered.

The embodiments herein and the various features and advantageous details thereof are explained more fully with reference to the non-limiting embodiments that are illustrated in the accompanying drawings and the following description. Numerous variations, changes, and substitutions may occur to those skilled in the art without departing from the invention. It should be understood that various alternatives to the embodiments of the present disclosure herein may be employed.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms used in the application, as all equivalents, synonyms, new developments, and terms or techniques that serve the same or a similar purpose are considered to be within the scope of the present claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

Any device or step to a method described in this disclosure can comprise or consist of that which it is a part of, or the parts which make up the device or step. The term "and/or" is inclusive of the items which it joins linguistically and each item by itself.

For purposes of this disclosure, the term "substantially" is defined as "at least 95% of" and less than or equal to 100% of the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

Words describing relative heights, such as "raised", "lowered", "lower", "above", and "below" refer, unless stated otherwise, to the orientation in which the device is typically used, which is, from bottom to top, as follows: wire chafing stand, lower pan, base rack, raised rack, upper pan.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within understood that the phraseology or the terminology employed herein is for description and not of limitation. Therefore, while the embodiments herein have been described in terms of preferred embodiments, those skilled in the art will recognize that the embodiments herein can be practiced with modification within the spirit and scope of the appended claims.

I claim:

1. A sexual stimulation device comprising:

a housing with a base and a robotic arm, said robotic arm movable in three pairs of orthogonal and perpendicular axes;

two sets of linear rails, each set of said two sets of linear rails being parallel to one another;

an upper set of said two sets of linear rails;

and a lower set of said two sets of linear rails;

configured such that said robotic arm has three degrees of freedom configured to cause reciprocating movement of said robotic arm in each of said three pairs of orthogonal and perpendicular axes simultaneously and circular movement of said robotic arm by combining movement in at least two degrees of freedom of said three degrees of freedom, said robotic arm extending out from said housing through an opening;

wherein said device is configured such that yaw rotation is combined with said reciprocating movement by alternating two linear actuators, with one actuator fully stopped while the other pushes and pulls, alternatingly.

2. The device of claim 1, further comprising a control system wherein said control system controls adjustment of speed of movement of said robotic arm in at least two of said three degrees of freedom.

3. The device of claim 1, wherein the reciprocating movement of the robotic arm in a sideways linear direction of said three degrees of freedom is controlled by one of said two sets of linear rails holding a main gantry and supported by four sliders to ensure stability.

4. The device of claim 1, wherein:

a hand crank is attached to a first end of a center axis of said robotic arm, and a second end of said robotic arm, opposite said first end, to a motor such that rotation of said hand crank causes off-center circular motion of said robotic arm.

5. The device of claim 4, wherein the hand crank further comprises two flanges attached to each other with offset centers adapted for high-speed rotations.

6. The device of claim 1, with at least one additional object in an upright orientation during rotational movements of the robotic arm in a circular direction, wherein the at least one additional object is securely attached to remain upright with only support by the robotic arm.

7. The device of claim 1, comprising a reciprocal linear actuator module with real-time stroke length control, creating continuous adjustment of a stroke length for linear movement along one of said three degrees of freedom during operation without interrupting rotation of the robotic arm.

8. The device of claim 1, further comprising a sexual robotic arm at an end of the robotic arm.

9. The device of claim 1, further comprising a game controller adapted to control the robotic arm position and rotation.

10. The device of claim 1, further comprising a control system that comprises a penetration control mechanism configured to adjust penetration depth of said device within a range of 1 to 7 inches in multiple discrete steps.

* * * * *